United States Patent [19]
Hyodo et al.

[11] Patent Number: 6,091,774
[45] Date of Patent: Jul. 18, 2000

[54] CODE-AMOUNT CONTROL DEVICE AND VIDEO CODING DEVICE INCLUDING THE CODE-AMOUNT CONTROL DEVICE

[75] Inventors: Masaaki Hyodo, Chiba; Yoichi Fujiwara, Ichihara; Tadao Matsuura, Chiba, all of Japan

[73] Assignee: Sharp Kabushiki Kaisha, Osaka, Japan

[21] Appl. No.: 09/030,205

[22] Filed: Feb. 25, 1998

[30] Foreign Application Priority Data

Feb. 25, 1997 [JP] Japan ................................. 9-041124

[51] Int. Cl.⁷ ...................................................... H04N 7/30
[52] U.S. Cl. ............................ 375/240; 348/405; 348/419
[58] Field of Search .................................... 348/384, 390, 348/403, 404, 405, 419; 375/240

[56] References Cited

U.S. PATENT DOCUMENTS

| | | | |
|---|---|---|---|
| 5,606,371 | 2/1997 | Klein Gunnewiek | 348/405 |
| 5,805,222 | 9/1998 | Nakagawa | 348/405 |
| 5,880,785 | 3/1999 | Fujiwara | 348/405 |

FOREIGN PATENT DOCUMENTS 4-307887 10/1992 Japan .

*Primary Examiner*—Bryan Tung

[57] ABSTRACT

The invention is directed to provide a code-amount control device for use in video-coding device, which controls the generated code-amount of each block (block length) after variable-length coding in the video-coding process to surely be less than the designated target code-amount. The code amount control device is provided with a rate control circuit for setting a target code-amount of each of blocks to be encoded, a rounding circuit for converting a sequence of quantized values into a set of the number of continuous zeroes and following thereto non-zero quantized values and a code-length table containing variable code-length values to be allocated to respective sets of the number of continuous zeroes and non-zero values. Before variable-length encoding of the image block, the rounding circuit estimates by accumulating the code length of each block with reference to the code-length table and outputs the quantized values as they are to a variable-length coding circuit when the accumulated code-length does not exceed the target code-amount. If the estimated code-length exceeds the target code-amount, the rounding circuit outputs the quantized values after rounding off the excessive portion thereof.

6 Claims, 8 Drawing Sheets

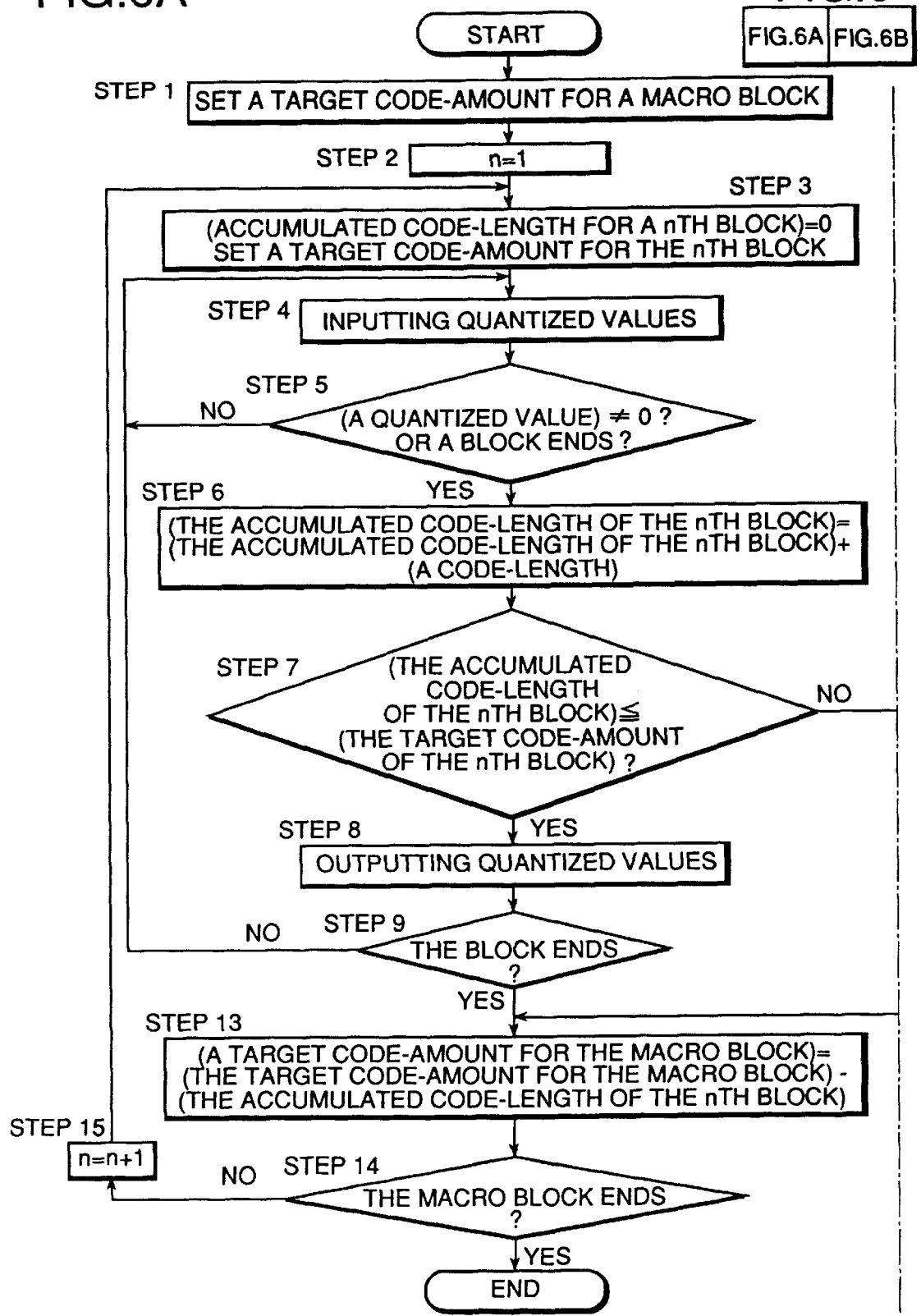

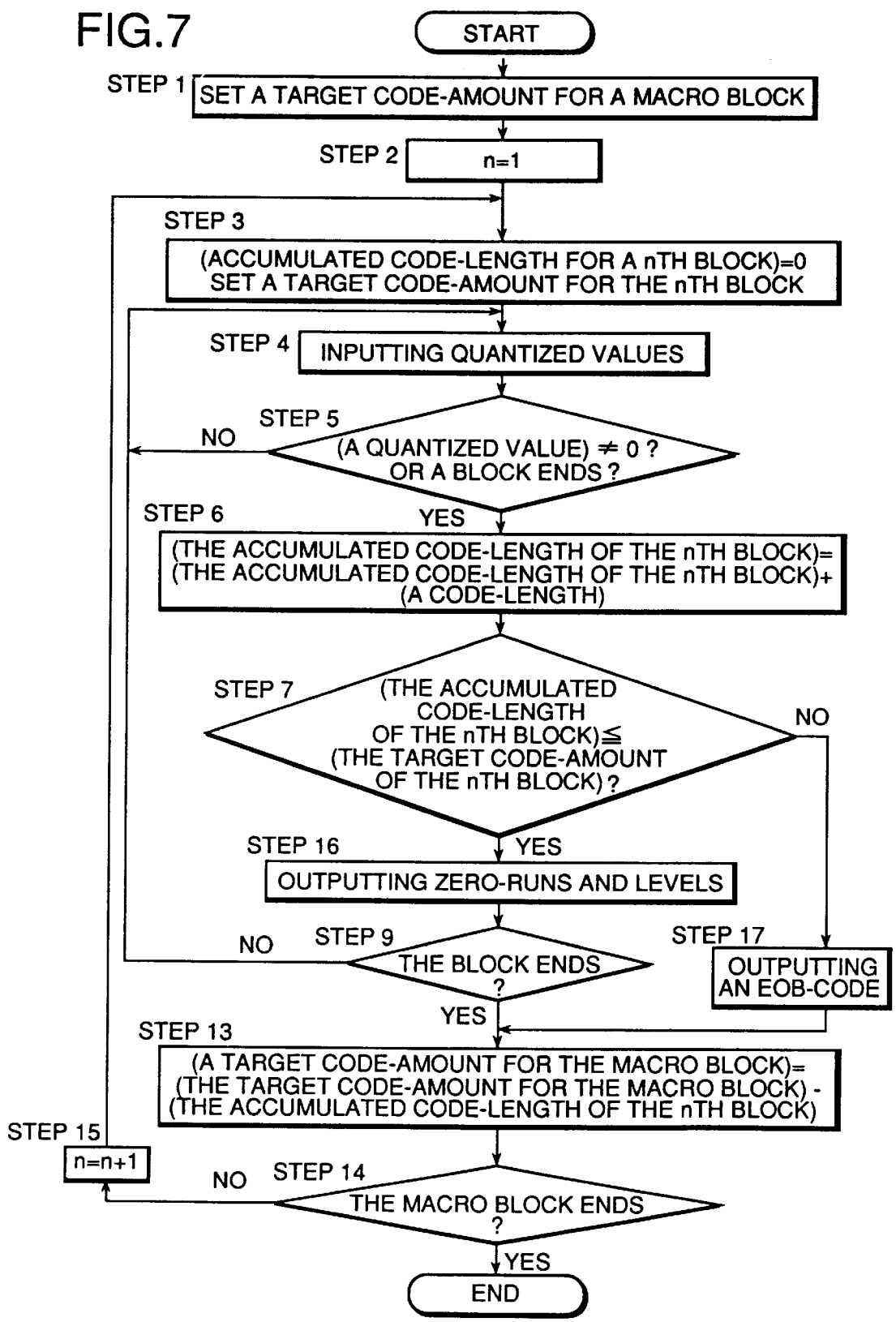

CODE-AMOUNT CONTROL DEVICE AND VIDEO CODING DEVICE INCLUDING THE CODE-AMOUNT CONTROL DEVICE

BACKGROUND OF THE INVENTION

The present invention relates to a code-amount control device and more particularly to a code-amount control device for controlling the amount of codes to be generated for encoding each block of video data in such a way that the code length of the coded block shall not exceed a specified target value when the code-amount control device is used in a video coding device for high efficiency encoding a video signal by interframe prediction method, and to the video coding device including the code-amount control device.

To record and transmit video information containing a very large amount of data, it is usually needed to reduce a rate of coded data by so called <image compression> or <high efficiency encoding> technique to a level at which the data can be recorded or transmitted without visually noticeable degradation of image quality or the data can have enough time to be recorded.

The MPEG method is a representative example of the high-efficiency coding technique. The MPEG method is established as standards ISO/IEC11172 and 13818, wherein interframe coding and variable-length coding are combined to realize a high efficiency video coding.

The MPEG coding device comprises a image memory, a motion-vector detecting circuit, a subtracter, a DCT (Discrete Cosine Transform) circuit, a quantization circuit, a variable-length coding circuit, an output buffer, an inverse quantization circuit, an inverse DCT circuit, an adder circuit, a decoded image memory, a predicted image generating circuit and a rate control circuit.

The operation of the coding device is as follows:

The image memory stores, for example, an input digital image signal in the format of 4:2:0 (cf. ITU-R Recommendation 601) and outputs the signal in macro blocks. A luminance signal is composed of macro blocks each consisting of 16×16 pixels while a chrominance signal is composed of macro block each consisting of 8×8 pixels. The processing operation is performed on every macro block. The motion vector detecting circuit receives from the image memory macroblock data of an image to be encoded and reference image data used for searching motion vectors and detects the motion vectors. The detected motion vectors are input to the decoded image memory that in turn outputs pixel data necessary for generating a predictive image to the predicted image generating circuit by which a predicted image is then generated. The subtracter subtracts the predicted image from the original image and outputs the subtraction result to the DCT circuit that in turn performs the discrete cosine transform of differential image data for each of blocks (8×8 pixels) of and outputs DCT coefficients. The quantization circuit selects a matrix for quantizing and quantizes the DCT coefficients according to a signal from the rate control circuit (to be described later) and outputs quantized values. The matrix for quantization is a set of quantization step sizes corresponding to DCT coefficients of 8×8 pixels. The variable-length coding circuit encodes with variable code length a set of continuous zeros (hereinafter referred to as zero run) followed by non-zero quantized values (hereinafter referred to as levels). The variable-length coded data is temporally stored in the output buffer and then output therefrom.

The quantized values outputted from the quantization circuit are also input to the inverse quantization circuit by which the values are inversely quantized. The inversely quantized values are then subjected to inverse discrete-cosine transform and added to the predicted image outputted from the predicted image generating circuit to produce decode data that will be stored in the decoded image memory. The decoded image data is used as predicted image data.

The amount of generated codes can be controlled by the rate control circuit that, observing occupied ratio of the output buffer, determines the number of bits to be allocated to macro blocks and controls the quantization matrix in such a way that the coded data may does not exceed the allocated number of bits. The quantization matrix is controlled to increase or decrease its value for reducing or increasing the amount of producible codes as the vacancy of the output buffer decreased or increased.

The above-mentioned system with the rate control circuit for controlling the value of the quantization matrix according to the vacancy of the output buffer uses a variable length coding method and, therefore, can not assure that the amount of generated codes becomes equal to the allocated number of bits. In addition, the MPEG method uses allocation of maximum 28 bits for an input image data whose pixel is represented by 8 bits, so MPEG method may generate very large amount of codes in comparison with amount of original image data in a short period.

Namely, such coded data that may have different amounts of generated codes must be processed by a processor whose capacity is enough to process a maximal bit rate of the coded data. This makes the hardware be very large.

Japanese Laid-open Patent Publication (TOKKAI HEI) No. 4-307887 discloses a rate control method that may reduce variation of the amount of codes to be generated. This method counts the amount of codes generated by variable-length encoding step and, if either of an average amount and a peak amount of generated codes exceeds a preset value, encodes a specified number of macro blocks and, after this, rounds off all the coefficients considered as zero.

There shows an example of application of the rate control method disclosed in Japanese Laid-open Patent Publication (TOKKAI HEI) No. 4-307887, which is applied to the video coding device above-mentioned. The video coding device differs from the above-mentioned MPEG coding device by the operation of its variable-length coding circuit and rate control circuit. Namely, the rate control circuit sets a target code-amount for each macro block and counts every code outputted from the variable-length coding circuit. The rate control circuit outputs a control signal to stop the operation of the variable-length coding circuit when the counted amount of codes exceeds the target value. By doing so, the amount of generated codes can be kept less than the target value.

However, the coding device after-mentioned requires the variable-length decoding circuit in addition to the coding device above-mentioned. Namely, the remaining coefficients are rounded off by the variable-length coding circuit and, therefore, an image decoded directly from the output of the quantization circuit and stored in the decoded image memory may differ from an image decoded by the decoding side. The variable-length decoding circuit must be provided with a table for restoring the variable-length code composed of the zero run and level values, which may have a large scale circuitry.

SUMMARY OF THE INVENTION

In view of the above-mentioned drawbacks of the prior art devices, the present invention was made to provide a code-amount control device that can control the amount of generated codes to be not more than a preset value and can be implemented with a minimally increased circuitry. The present invention is also directed to a video coding device including the above-mentioned code-amount control device.

Accordingly, an object of the present invention is to provide a code-amount control device that can solve the fore-described problems involved in the prior art devices and is used in a video-coding device that divides image data into a plurality of blocks, performs interframe prediction of the blocks one by one, orthogonally transforms the prediction errors, quantizes the transforming coefficients and encodes the quantized values by a variable-length coding circuit. The code-amount control device is intended to control the code-amount for each of the blocks and comprises converting means for converting the quantized values into a plurality of data under designated conditions, table means for outputting a code-length corresponding to data coded by variable-length coding, accumulating means for determining a predicted code-amount by accumulating the code-length values for each block or for each of subdivisions (subblocks) of the block, rate control means for outputting a target code-amount for each block or each subblock and output selecting (switching-over) means for comparing a predicted code-amount with the target code-amount and rounding off an excessive portion of a quantized value if the predicted code-amount exceeds the target code-amount.

Another object of the present invention is to provide a video coding device with the code-amount control device, wherein converting means arranges two-dimensional quantized values for each subblock in a specified one-dimensional order and converts the quantized values into data composed of a set of the number of continuous zeroes and following thereto non-zero quantized values, the output switching-over means outputs an input sequence of the quantized values when the predicted code-amount does not exceed the target code-amount and outputs a sequence of quantized values by forcing an excessive portion of the predicted quantized values to zero when the predicted code-amount exceeds the target code-amount, and the variable-length coding circuit provided with the converting means converts the data to corresponding variable-length codes, outputs the sequence of the codes and finally outputs a block ending code when the quantized values thereafter in the block are all zeros.

Another object of the present invention is to provide a video coding device with the code-amount control device, wherein the converting means arranges two-dimensional quantized values for each subblock in a specified one-dimensional order and converts the quantized values into data composed of a set of the number of continuous zeroes and following thereto non-zero quantized values, the output switching-over means outputs the data when the predicted code-amount does not exceed the target code-amount and outputs a block ending code when the predicted code-amount exceeds the target code-amount, and the variable-length coding circuit outputs the data converted to corresponding variable-length codes and outputs the block end code when said block end code is input.

A further object of the present invention is to provide a video coding device with the code-amount control device, wherein the converting means arranges two-dimensional quantized values for each subblock in a specified one-dimensional order and converts the quantized values into data composed of a set of the number of continuous zeroes, following thereto non-zero quantized values and a flag indicating the presence or absence of non-zero after the preceding quantized values, the output switching-over means outputs a sequence of input quantized values when the predicted code-amount does not exceed the target code-amount and outputs a sequence of quantized value determined by forcing the quantized value of an excessive portion of the predicted code-amount to zero when the predicted code-amount exceeds the target code-amount, and the variable-length coding circuit provided with the converting means outputs the data converted to corresponding variable-length codes.

A still further object of the present invention is to provide a video coding device with the code-amount control device, wherein the converting means arranges two-dimensional quantized values for each subblock in a specified one-dimensional order and converts the quantized values into data composed of a set of the number of continuous zeroes, following thereto non-zero quantized values and a flag indicating the presence or absence of non-zero after the preceding quantized values, the output switching-over means outputs the data when the predicted code-amount does not exceed the target code-amount and outputs the data with a flag set to indicate the absence of a non-zero quantized value when the predicted code-amount exceeds the target code-amount, and the variable-length coding circuit outputs the data converted to the corresponding variable-length codes.

Another object of the present invention is to provide a code-amount control device or a video coding device with the code-amount control device, wherein the rate control means sets a target code-amount for each block, sets a target code-amount for each subblock by distributing the target code-amount for the block, updates the target code-amount for the block by subtracting an actually generated code-amount from the current target code-amount of the block every time after a subblock is encoded by the variable-length coding circuit and updates the target subblock code-amount by distributing the updated target block code-amount to the remaining subblocks.

As described above, the code control device according to the present invention can convert each of the two-dimensional quantized values rearranged in a designated one-dimensional order into data composed of a set of the number of continuous zeros and following thereto non-zero quantized values or a set of the number of continuous zeros, following thereto non-zero quantized values and a flag indicating the presence or absence of non-zero quantized values after the indicated non-zeros, previously determines the code-amount to be generated before a variable-length encoding step by reading a table containing the code length values of coded data, and controls the producible code-amount not to exceed the target code-amount by cutting off an excessive portion of the quantized values if the pre-read code-amount exceeds the target code-amount.

BRIEF DESCRIPTION OF DRAWINGS

FIG. 6 shows the correct alignment of the drawing sheets for FIGS. 6A and 6B.

FIGS. 6A and 6B are a flow chart for explaining a sequence of setting a target code-amount corresponding to the first embodiment of the present invention.

FIG. 7 is a flow chart for explaining a sequence of setting a target code-amount corresponding to the second embodiment of the present invention.

PREFERRED EMBODIMENTS OF THE INVENTION

The present invention relates to a code-amount control device and more particularly to a code-amount control device for controlling the amount of codes to be generated for encoding each block of video data in such a way that the code length of the coded block shall not exceed a specified target value when the code-amount control device is used in a video coding device for high efficiency encoding a video signal by interframe prediction method, and to the video coding device including the code-amount control device.

To record and transmit video information containing a very large amount of data, it is usually needed to reduce a rate of coded data by so called <image compression> or <high efficiency encoding> technique to a level at which the data can be recorded or transmitted without visually noticeable degradation of image quality or the data can have enough time to be recorded.

Prior to explaining preferred embodiments of the present invention, prior art code-amount control device and video coding device including the code-amount control device will be described below as references for the present invention.

The MPEG method is a representative example of the high-efficiency coding technique. The MPEG method is established as standards ISO/IEC11172 and 13818, wherein interframe coding and variable-length coding are combined to realize a high efficiency video coding.

Figure 1:
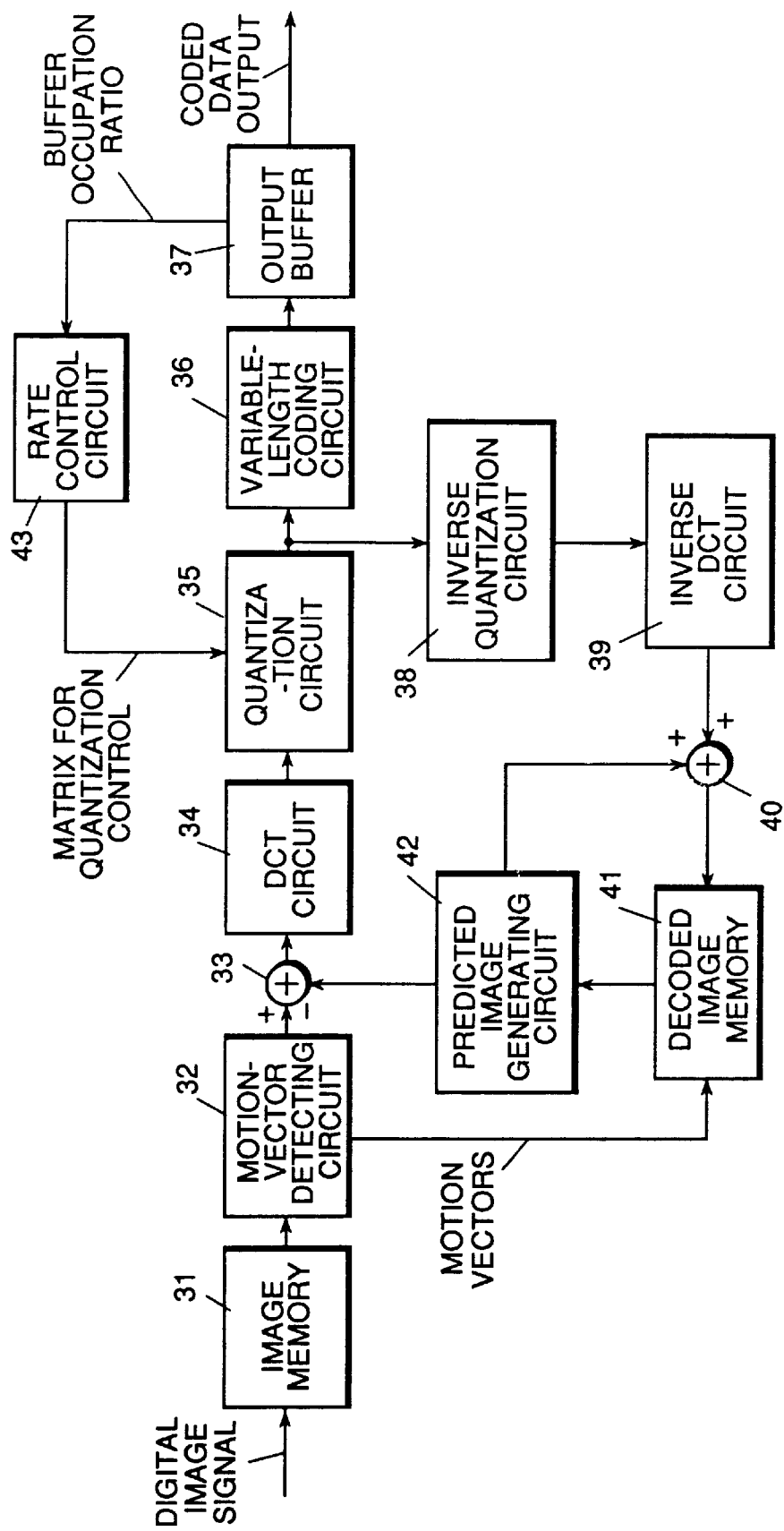
FIG. 1 shows an example of a prior art video coding device.

FIG. 1 is a block diagram showing an example of an MPEG coding method.

As shown in FIG. 1, the MPEG coding device comprises a image memory 31, a motion-vector detecting circuit 32, a subtracter 33, a DCT (Discrete Cosine Transform) circuit 34, a quantization circuit 35, a variable-length coding circuit 36, an output buffer 37, an inverse quantization circuit 38, an inverse DCT circuit 39, an adder circuit 40, a decoded image memory 41, a predicted image generating circuit 42 and a rate control circuit 43.

The operation of the coding device of FIG. 1 is as follows:

The image memory 31 stores, for example, an input digital image signal in the format of 4:2:0 (cf. ITU-R Recommendation 601) arid outputs the signal in macro blocks. A luminance signal is composed of macro blocks each consisting of 16×16 pixels while a chrominance signal is composed of macro block each consisting of 8×8 pixels. The processing operation is performed on every macro block. The motion vector detecting circuit 32 receives from the image memory 31 macroblock data of an image to be encoded and reference image data used for searching motion vectors and detects the motion vectors. The detected motion vectors are input to the decoded image memory 41 that in turn outputs pixel data necessary for generating a predictive image to the predicted image generating circuit 42 by which a predicted image is then generated. The subtracter 33 subtracts the predicted image from the coded image and outputs the subtraction result to the DCT circuit 34 that in turn performs the discrete cosine transform of differential image data for each of blocks (8×8 pixels) of and outputs DCT coefficients. The quantization circuit 35 selects a matrix for quantization and quantizes the DCT coefficients according to a signal from the rate control circuit 43 (to be described later) and outputs quantized values. The matrix for quantization is a set of quantization step sizes corresponding to DCT coefficients of 8×8 pixels. The variable-length coding circuit 36 encodes with variable code length a set of continuous zeros (hereinafter referred to as zero run) followed by non-zero quantized values (hereinafter referred to as levels). The variable-length coded data is temporally stored in the output buffer 37 and then output therefrom.

The quantized values outputted from the quantization circuit 35 are also input to the inverse quantization circuit 38 by which the values are inversely quantized. The inversely quantized values are then subjected to inverse discrete-cosine transform and added to the predicted image outputted from the predicted image generating circuit 42 to produce decode data that will be stored in the decoded image memory 41. The decoded image data is used as predicted image data.

The amount of generated codes can be controlled by the rate control circuit 43 that, observing occupied ratio of the output buffer 37, determines the number of bits to be allocated to macro blocks and controls the quantization matrix in such a way that the coded data may does not exceed the allocated number of bits. The quantization matrix is controlled to increase or decrease its value for reducing or increasing the amount of producible codes as the vacancy of the output buffer 37 decreased or increased.

The above-mentioned system with the rate control circuit for controlling the value of the quantization matrix according to the vacancy of the output buffer uses a variable length coding method and, therefore, can not assure that the amount of generated codes becomes equal to the allocated number of bits. In addition, the MPEG method uses allocation of maximum 28 bits for an input image data whose pixel is represented by 8 bits, so MPEG method may generate very large amount of codes in comparison with amount of original image data in a short period.

Namely, such coded data that may have different amounts of generated codes must be processed by a processor whose capacity is enough to process a maximal bit rate of the coded data. This makes the hardware be very large.

Japanese Laid-open Patent Publication (TOKKAI HEI) No. 4-307887 discloses a rate control method that may reduce variation of the amount of codes to be generated. This method counts the amount of codes generated by variable-length encoding step and, if either of an average amount and a peak amount of generated codes exceeds a preset value, encodes a specified number of macro blocks and, after this, rounds off all the coefficients considered as zero.

Figure 2:
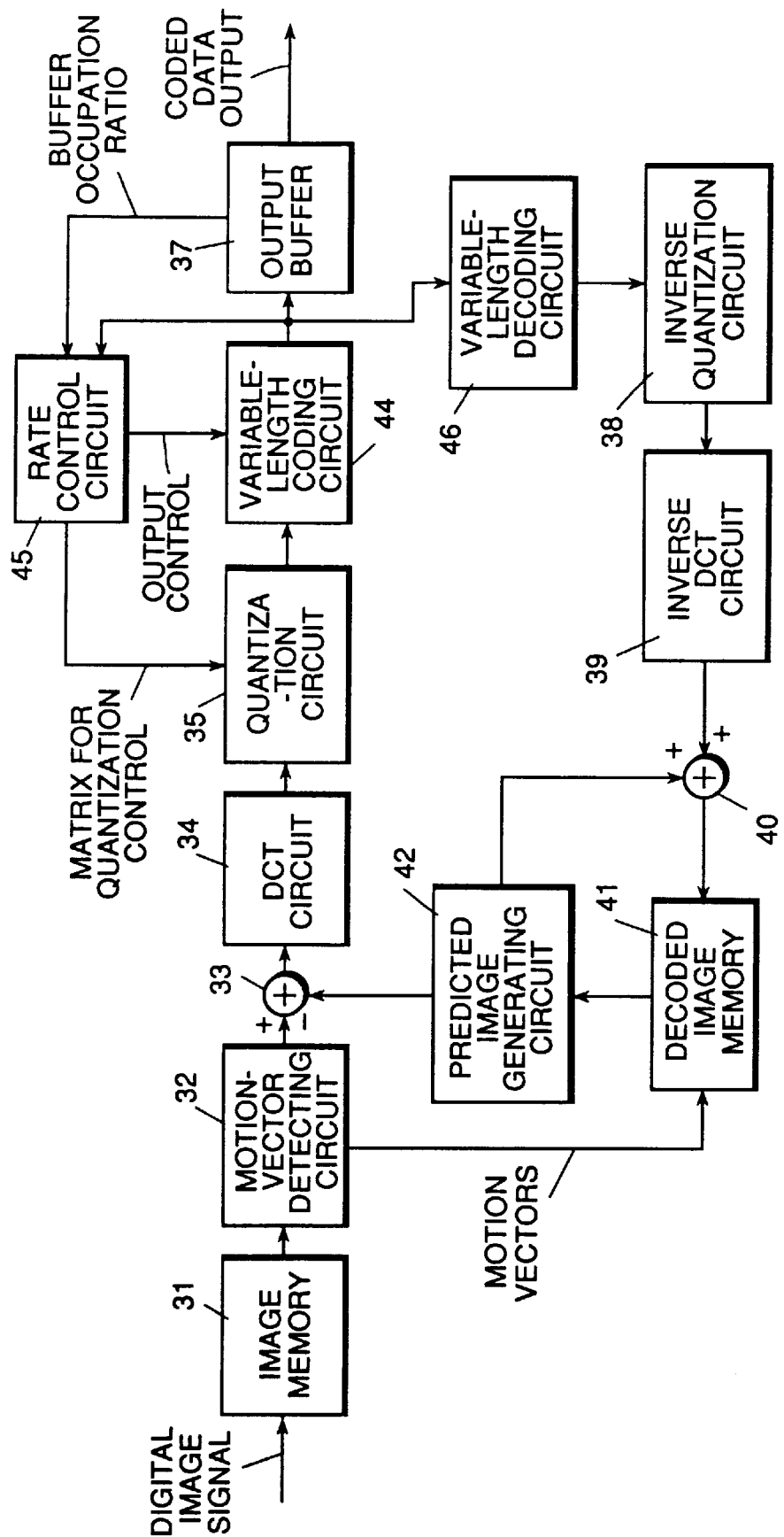
FIG. 2 shows another example of a prior art video coding device.

FIG. 2 is a block diagram showing an example of application of the rate control method disclosed in Japanese laid-open Patent Publication (TOKKAI HEI) No. 4-307887, which is applied to the video coding device of FIG. 1. The system of FIG. 2 differs from the system of FIG. 1 by the operations of its variable-length coding circuit 44 and rate control circuit 45. Namely, the rate control circuit 45 sets a target code-amount for each macro block and counts every code outputted from the variable-length coding circuit 44. The rate control circuit 45 outputs a control signal to stop the operation of the variable-length coding circuit when the counted amount of codes exceeds the target value. By doing so, the amount of generated codes can be kept less than the target value.

However, the coding device of FIG. 2 requires the variable-length decoding circuit 46 in addition to the coding device of FIG. 1. Namely, the remaining coefficients are rounded off by the variable-length coding circuit 44 and, therefore, an image decoded directly from the output of the quantization circuit 35 and stored in the decoded image memory 41 may differ from an image decoded by the decoding side. The variable-length decoding circuit 46 must be provided with a table for restoring the variable-length code composed of the zero run and level values, which may have a large scale circuitry.

Referring to accompanying drawings, preferred embodiments of the present invention will be described below in detail.

Figure 3:
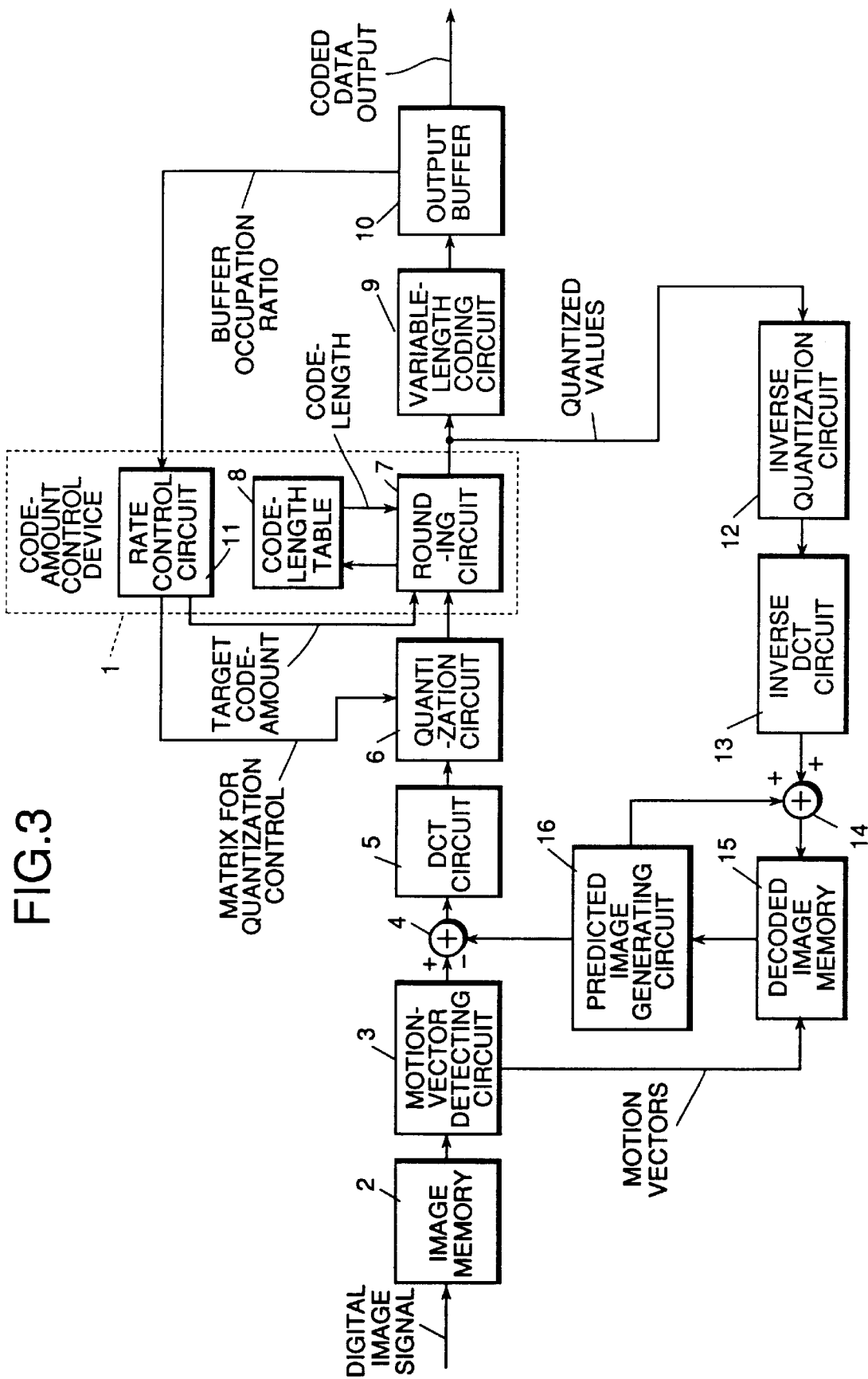
FIG. 3 is a block diagram of a video coding device provided with a code-amount control device, which is a first embodiment of the present invention.

FIG. 3 is a block diagram of a video coding device including a code-amount control device, which is a first embodiment of the present invention. The code-amount control device of FIG. 3 comprises a rounding circuit 7, a code-length table 8 and a rate control circuit 11.

It is supposed that a digital image signal in the format of, e.g., 4:2:0 (cf. ITU-R Recommendation 601) is now input to a image memory 2. In this case, a motion-vector detecting circuit 3 detects motion vectors for each macro block consisting of blocks of 16×16 pixels for luminance components and blocks of (8×8 pixels)×2 for chrominance signal components. The number of pixels for chrominance signal components may vary depending on an input image format. For example, data may consist of (16×8 pixels)×2 or (16×16 pixels)×2. With the input image in the format of 4:2:0, a macro block is composed of 4 blocks (each block consisting of 8×8 pixels) of luminance components and 2 blocks of chrominance signal components.

The macro-block motion vectors detected by the motion vector detecting circuit 3 are input to a decoded image memory 15 that in turn outputs data of a preceding decoded image portion designated by the input motion vectors, which data is used for prediction. A predicted image generating circuit 16 generates a predicted image. A subtracting circuit 4 subtracts the predicted image from an image to be encoded. The subtraction result is subjected to discrete cosine transform (DCT) by a DCT circuit 5. DCT coefficients are output in a predetermined order. e.g., a zigzag scanning order. The DCT coefficients are quantized by a quantization circuit 6. The quantized values are successively input to a rounding circuit 7 that converts successively input quantized values into a set of a zero run (the number of continuous zeros) and following thereto levels (non-zero quantized values) and outputs the set to a code-length table 8. The code-length table 8 contains code length values to be allocated to zero-runs and levels in variable-length encoding and outputs code-length values corresponding to an input set of zero-runs and levels. The rounding circuit 7 receives code-length values from the code-length table 8 and accumulates the code-length values for each of macro blocks or blocks.

The rounding circuit 7 also receives a target code-length value for a macroblock or a block of 8×8 pixels from the rate control circuit 11, compares the accumulated value to the target value and outputs the input quantized values as they were input thereto from the quantization circuit 6 when the accumulated value does not exceed the target value or outputs zeros instead of the quantized values when the accumulated value exceeds the target value. According to the MPEG method, a control character EOB (end of block) is given and the variable-length encoding is finished if there are all zeros after any quantized value in the block. Therefore, a corrected target value is determined by the following equation (1).

$$\text{(Corrected target code-length)}=\text{(Target code-length)}-\text{(Code-length of EOB)} \quad (1)$$

It is therefore possible to make the generated code amount to be always less than the target value by rounding off quantized values when the accumulated value exceeds the corrected target value determined according to the equation (1).

Figure 4:
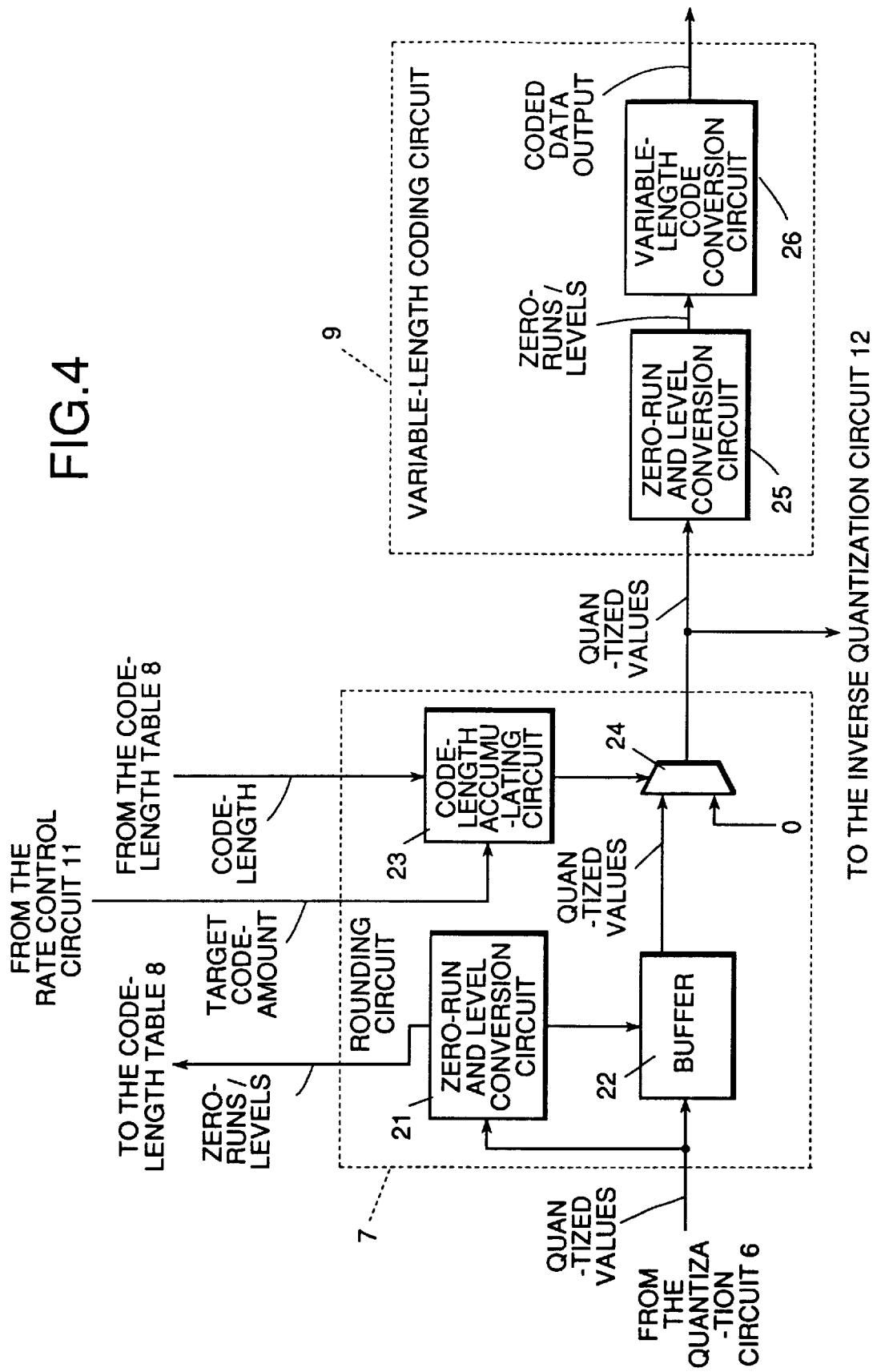
FIG. 4 is a block diagram for showing in detail a rounding circuit and a variable-length coding circuit, both of which is shown in FIG. 1.

Quantized values from the rounding circuit 7 are input to a variable-length coding circuit 9 where they are converted again into zero runs and levels and then subjected to variable-length encoding. The coded values are output to an output buffer 10. The quantized values from the rounding circuit 7 are also input to an inverse quantization circuit 12 whereby they are inversely quantized. The reconstructed DCT coefficients are input to an inverse DCT circuit 13 whereby they are subjected to inverse discrete-cosine transform. An adder 14 adds the result of inverse DCT to a predicted image inputted from a predicted image generating circuit 16. The result of addition as a decoded image data is input to a decoded image memory 15. FIG. 4 is a block diagram showing in detail the rounding circuit 7 and variable-length coding circuit 9 used in the first embodiment of FIG. 3. In FIG. 4, quantized values are input to a zero-run and level conversion circuit 21 and a buffer 22 included in the rounding circuit 7. The converting circuit 21 counts the number of continuous zeros in a sequence of quantized values and outputs the count value as a zero-run and succeeding non-zero quantized values as levels to a code-length table 8. A control signal is given to the buffer 22 to output quantized values accumulated therein in synchronization with the operation of a multiplexer 24 (to be described later). The code-length accumulating circuit 23 receives a target code-amount for a macro block or a block from the rate control circuit 11 and receives a code-length from the code-length table 8 every time when the table receives a non-zero quantized value. The code-length accumulating circuit 23 accumulates the code-length for a macro block or a block. The multiplexer 24 is controlled so that it outputs quantized values until the accumulated code-length does not exceed the target code length and outputs zero when the accumulated code-length exceeds the target code-length.

The quantized values from the multiplexer 24 are input to an inverse quantization circuit 12 and a zero-run and level conversion circuit 25 in the variable-length coding circuit 9. The zero-run and level conversion circuit 25 is identical to the zero-run and level conversion circuit 21. It converts successively inputted quantized values into a set of zero runs and levels and outputs the conversion result to a variable-length conversion circuit 26 that in turns outputs variable-length codes representing the set of zero-runs and levels.

Figure 5:
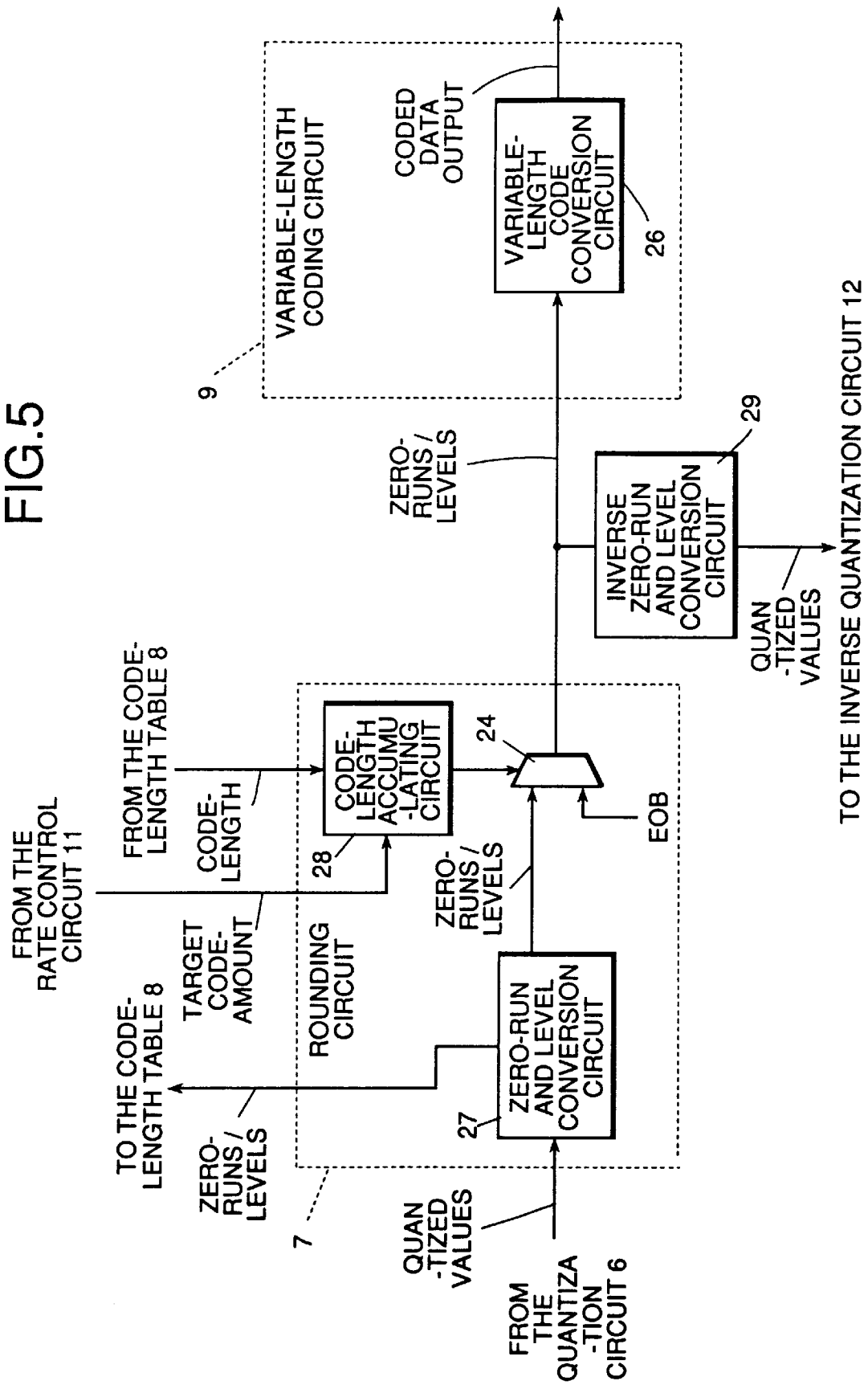
FIG. 5 is a block diagram for showing in detail a rounding circuit and a variable-length coding circuit, which compose a second embodiment of a video coding device according to the present invention.

A video coding device including a code-amount control device, which is a second embodiment of the present invention, will be described as follows:

FIG. 5 shows a rounding circuit 7 and a variable-length coding circuit 9, only by which the second embodiment differs from the first embodiment shown in FIG. 3.

In the first embodiment described above, quantized values outputted from the rounding circuit 7 are converted first into zero runs and levels and then encoded in variable-length codes by the variable-length coding circuit 9. On the other hand, the second embodiment shown in FIG. 5 outputs zero runs arid levels from the rounding circuit 7 and the variable-length coding circuit 9 can directly encode the output of the rounding circuit 7, omitting the step of converting the output into zero-runs and levels. The rounding circuit 7 is provided with a converter 27 for previously reading code-length, by which it can easily convert quantized values into zero-runs and levels. In the second embodiment, the rounding circuit 7 outputs the zero-runs and levels and, therefore, an inverse zero-run and level conversion circuit 29 must inversely convert the zero-runs and levels into quantized values to be supplied to an inverse quantization circuit 12. The inverse zero-run and level conversion circuit 29 can be easily constructed of a counter and a register.

In FIG. 5, the zero-run and level conversion circuit 27 included in the rounding circuit 7 converts a sequence of quantizing values into a set of zero-runs and levels and outputs the conversion result to a code-length table 8 and a multiplexer 24. Code-length accumulating circuit 28 is given a target code-length value for a macro block or a block from a rate control circuit 11 at the start inputting of quantized values of macroblock or block and a predicted code-length value for a set of zero runs and levels from the code-length table 8 whenever non-zero quantized value is input. The code-length accumulating circuit 28 accumulates code-length components of each macro block or each block. The multiplexer 24 is controlled so that it outputs zero-runs and levels until the accumulated code-length does not exceed the target code-length and it outputs only once an end-of-block code indicating that coefficients existing thereafter are all 0s.

The "zero-runs and levels" outputted from the multiplexer 24 are input to a variable-length conversion circuit 26 that in turn outputs a variable length code corresponding to the set of zero runs and levels. The set of zero-runs and levels is also input to an inverse zero-run and level conversion circuit 29 from which inversely converted quantized values are output to an inverse quantization circuit 12.

Modified embodiments of the present invention will be described as follows:

A first modification is similar to but differs from the first embodiment of FIG. 3 by applying the three-dimensional variable-length coding method. In the first embodiment, a set of two kinds of values (i.e., zero-runs and levels) is converted into variable-length codes and is additionally followed by an EOB (End-Of-Block) code when all are 0s after a last level value in a block. In this modified embodiment, a set of three kinds of values (i.e., zero-run, levels and an EOB flag) is converted into a variable-length code. The EOB flag indicates whether any non-zero quantized value appears after the last level value in the block. Namely, all variable-length codes contain information indicating the EOB, omitting a code representing only the end of block. Consequently, this modification is realized by modifying the zero-run and level conversion circuits 21 and 25 (FIG. 4) in such a way that they can convert a sequence of quantized values into a set of zero-runs, levels and an EOB flag.

This modified embodiment differs from the first embodiment by the variable-length coding method and, therefore, has a different content of its code-length table.

A second modified embodiment differs from the second embodiment only by its variable-length coding method. Namely, the difference is that a rounding circuit 7, shown in FIG. 5, of this modified embodiment outputs a signal consisting of zero-runs, levels and an EOB flag. In other words, this modification is achieved by modifying the zero-run and level conversion circuit 27 to convert an input sequence of quantized values into zero-runs, levels an EOB flag, the multiplexer 24 to select the value of EOB flag and the inverse zero-run and level conversion circuit 29 to convert a set of zero-runs, levels and an EOB flag into a sequence of quantized values. In this example, the multiplexer 24 selects the value of EOB flag showing the presence of a non-zero quantized value when an accumulated code-length does not exceed a target code-amount, and it selects the other value of EOB flag showing the absence of a non-zero quantized value when the accumulated code-length exceeds the target code-amount.

Referring to a flowchart of FIGS. 6A and 6B, the process of setting a target code-amount for each of blocks composing a macro block for which a target code-amount has been set will be described below.

Figure 6B:
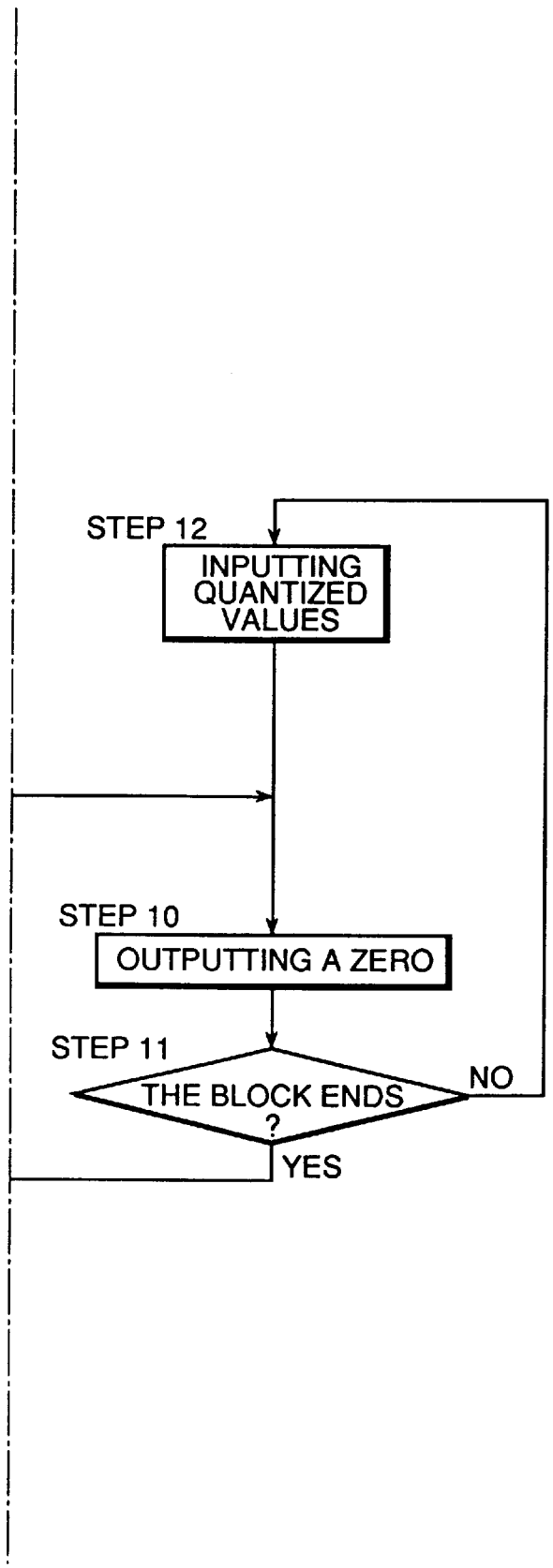

The flowchart of FIGS. 6A and 6B relates the first embodiment of FIG. 3.

The rate control circuit 11 sets first a target code-amount for a macro block (Step 1). The rounding circuit 7 sets a variable "n" representing the serial number of a block to 1 (Step 2) and sets the accumulated code-length of the block to 0. The target code-amount is distributed to respective blocks composing the macro block at different proportions predetermined for respective blocks. A target code-amount for the first block is thus determined and set (Step 3). Supposing, for example, a macro block is composed of m blocks and Rn is the ratio of the code-amount allocated to nth block, the target code-amount for the first block is determined as follows:

$$(\text{Target code-amount for the first block}) = (\text{The target code-amount for the macro block}) \times R1 \bigg/ \sum_{i=1}^{m} Ri$$

A quantized value is input from the quantization circuit 6 (Step 4). It is examined whether the input quantized value is 0 and a block ends (Step 5). When the quantized value is 0 and the block does not end, it can not be encoded and, therefore, the process returns to Step 4 to input a next quantized value. When the quantized value is not 0 or the block ends, a code-length of the variable-length code is determined from the code-length table 8 according to the zero-runs and levels of the input quantized value and is added to the accumulated code-length of the block (Step 6). The quantized value without any additional processing is output to the variable-length coding circuit 9 (Step 8) and the block is checked for whether it ended (Step 9). Steps 4 to 9 are repeated until the block ends.

In case if the accumulated code-length of the block exceeds the target code-amount (at Step 7), zero instead of the quantized value is output (Step 10) and the block is checked for whether it ends (Step 11). Steps 10 to 12 are repeated with repeatedly outputting zeros until the block ends. When the block ends, the target code-amount value of the macro block is decreased by the accumulated code-amount value (Step 13). Namely, the target code-amount value of the macro block is updated as the code-amount value to be distributed to still not-coded remaining blocks. The macro block is checked for whether it ends (Step 14). If not, the variable "n" representing the serial number of the current block is incremented by 1 (Step 15) and the process returns to process a succeeding block. This procedure is repeated until the macro block ends.

According to the above-mentioned procedure, it is possible to allocate the code-amount to blocks at preset shares respectively and to distribute again the remained code-amount to not-coded blocks.

At Step 3, the target code-amount for the nth block can be determined as follows:

$$\text{(A target code-amount of the nth block)} =$$

$$\text{(A target code-amount of a macro block)} \times Rn \Big/ \sum_{i=n}^{m} Ri$$

In the equation, m is the number of blocks composing a macro block.

At Step 7, the judgment is made with reference to the corrected target code-amount determined according to the equation (1) or by using the following discriminant:

(Accumulated code-length of the nth block)=(Target code-amount of the nth block)−(EOB code-length)

The flowchart of FIGS. 6A and 6B relates to the first embodiment but it may be easily modified to a flowchart adapted to the second embodiment. Namely, the difference between the first and second embodiments exists in that the rounding circuit of the first embodiment outputs quantized values while the rounding circuit of the second embodiment outputs a set of zero-runs and levels.

FIG. 7 is a flowchart adapted to the second embodiment, which differs from the flowchart of FIGS. 6A and 6B in that a set of zero-runs and levels is output (at Step 16) when the accumulated code length is less than the target code-amount (at Step 7) and an EOB code is output at Step 17 to finish the processing when the accumulated code-length exceeds the target code-amount at Step 7.

The flowcharts of FIGS. 6A, 6B and 7 describe the operations of the first and second embodiments of the present invention, which are similar to flowcharts (not shown) of the modified first and second embodiments described before.

As is apparent from the foregoing, the use of the code-amount control device according to the present invention can surely control the generation of codes not to exceed a target code-amount in a video coding system with a least increase in hardware. In this case, this device can also serve a function for limiting the maximal code-amount of a signal when working with a constant target code-amount.

The code-amount control device according to the present invention can surely control the generated code-amount less than the target code-amount by previously estimating the code-amount to be generated for encoding every block or subblock and cutting off the excessive portion of the code-amount over the target code-amount. This device does not require the provision of a large-scaled variable-length decoding circuit. The device uses a table containing variable code-length data for code-length estimation, which requires not-so-large hardware because the code-length data can be represented by a short bit. An image encoded based on the MPEG system does not suffer impairment of its quality by the influence of cutting-off a portion of quantized values because the cutoff portion contains mainly high-frequency components.

A variable-length coding circuit to be connected to a code-amount control device whose output is a sequence of quantized values must be usually provided with the same converting means as the device has. The need for such converting means is eliminated by the code-amount control device according to the present invention, in which an inverse conversion circuit for inversely converting output data into quantized values is provided before an inverse quantizing circuit. This circuitry is very simple as compared with the converting means and makes the variable-length coding circuit usable with no additional converting means.

The code-amount control device according to the present invention can work by updating a target code-amount by the rate-control means that, whenever encoding each of subblocks, updates the target code-amount value by subtracting the number of actually generated codes therefrom and re-allocates the updated value to the remaining subblocks. In such operating mode, the code-amount control device can set a target code-amount for each of blocks, further distribute the target code-amount to each of subblocks composing a current block and control the code-amount by updating and adaptively distributing the target code-amount for the block, thus minimizing the cutoff portions of the quantized values. This realizes evenly rounding-off the quantized values over the blocks and, thereby, improving the block image quality.

Although the code-amount coding device according to the present invention is used to control the code-amount not to exceed an updatable target code-amount in variable-length encoding system, it may be also used with a fixed target code-amount to limit and maintain the maximal code-amount less than a specified constant value.

We claim:

1. A code-amount control device, which is used in a video coding device for encoding a video-sequence by performing an interframe-prediction for each block, orthogonally transform an interframe-prediction error, quantizing transform coefficients and encoding the quantized values by a variable-length encoding circuit, for controlling the code-amount for each of blocks into which an image data is divided, comprising: converting means for converting under designated conditions the quantized values into a plurality of data; table means for outputting the code-length of a variable-length code corresponding to each data; accumulating means for determining a predictive code-amount by accumulating the code-lengths for each block or each of subblocks into which each block is divided; rate control means for outputting the target code-amount per block or subblock; and output switching-over means for rounding off a portion of the quantized values, said portion exceeding the target code-amount when the predictive code-amount exceeds the target code-amount.

2. A video coding device with the code-amount control device as defined in claim 1, wherein the converting means arranges a sequence of two-dimensional quantized values for each subblock in a sequence of one-dimensional quantized values of specified order and converts the quantized values into data composed of a set of the number of continuous zeroes and following thereto non-zero quantized values, the output switching-over means outputs an input sequence of quantized values as it is when the predicted code-amount does not exceed the target code-amount and outputs a sequence of quantized values determined by forcing an excessive portion of the predicted quantized values to zero when the predicted code-amount exceeds the target code-amount, and the variable-length coding circuit provided with the converting means converts the data into corresponding variable-length code, outputs the sequence of the codes and finally outputs a block ending code when all of the quantized values are zeroes.

3. A video coding device with the code-amount control device as defined in claim 1, wherein the converting means arranges a sequence of two-dimensional quantized values for each subblock in a sequence of one-dimensional quantized values of specified order and converts the quantized values into data composed of a set of the number of continuous zeroes and following thereto non-zero quantized values, the output switching-over means outputs the data when the predicted code-amount does not exceed the target code-amount and outputs a block ending code when the predicted code-amount exceeds the target code-amount, and the variable-length coding circuit outputs the data converted to corresponding variable-length codes and outputs the block ending code when the block ending code is input.

4. A video coding device with the code-amount control device as defined in claim 1, wherein the converting means arranges a sequence of two-dimensional quantized values for each subblock in a sequence of one-dimensional quantized values of specified order and converts the quantized values into data composed of a set of the number of continuous zeroes and following thereto non-zero quantized values and a flag indicating the existence or absence of a non-zero quantized value after the preceding quantized values, the output switching-over means outputs a sequence of input quantized values when the predicted code-amount does not exceed the target code-amount and outputs a sequence of quantized values determined by forcing an excessive portion of the predicted quantized values to zero when the predicted code-amount exceeds the target code-amount, and the variable-length coding circuit provided with the converting means outputs the data converted into corresponding variable-length codes.

5. A video coding device with the code-amount control device as defined in claim 1, wherein the converting means arranges a sequence of two-dimensional quantized values for each subblock in a sequence of one-dimensional quantized values of specified order and converts the quantized values into data composed of a set of the number of continuous zeroes and following thereto non-zero quantized values and a flag indicating the presence or absence of non-zero after the preceding quantized values, the output switching-over means outputs the data when the predicted code-amount does not exceed the target code-amount and outputs the data with a flag set to indicate the absence of a non-zero quantized value when the predicted code-amount exceeds the target code-amount, and the variable-length coding circuit outputs the data converted to the corresponding variable-length codes.

6. A code-amount control device or a video coding device with the code-amount control device as defined in any one of claims 1 to 5, wherein the rate control means sets a target code-amount for each block, sets a target code-amount for each subblock by allocating the target code-amount for the block to subblocks, updates the target code-amount for the block by subtracting an actually generated code-amount from the current target value of the block every time after one subblock is encoded by the variable-length coding circuit and updates the target code-amount for a next subblock by allocating the updated target code-amount of the block to the remaining subblocks.

* * * * *